United States Patent [19]
Bullivant

[11] Patent Number: 5,765,698
[45] Date of Patent: Jun. 16, 1998

[54] PANEL ASSEMBLY WITH ANGULARLY ORIENTED HINGES

[75] Inventor: Todd J. Bullivant, Stonington, Conn.

[73] Assignee: Hubbell Incorporated, Orange, Conn.

[21] Appl. No.: 711,938

[22] Filed: Sep. 4, 1996

[51] Int. Cl.[6] .................................................. A47F 5/00
[52] U.S. Cl. ........................... 211/26; 211/99; 361/826; 361/829
[58] Field of Search ............................ 211/26, 99, 170; 248/300, 291.1, 68.1, 49, 65; 361/826, 829

[56] References Cited

U.S. PATENT DOCUMENTS

| | | | |
|---|---|---|---|
| 4,441,684 | 4/1984 | Credle | 211/26 X |
| 4,641,754 | 2/1987 | Hebel et al. | 211/26 |
| 4,665,546 | 5/1987 | Brey et al. | 361/826 X |
| 5,575,665 | 11/1996 | Shramawick et al. | 439/49 |
| 5,586,012 | 12/1996 | Levman | 211/26 X |
| 5,615,850 | 4/1997 | Cloninger | 211/26 X |

OTHER PUBLICATIONS

Ortronics Open System Architecture Catalog, "Bottom Hinged Wall Mount Brackets" and Category 5 110PCB Patch Panels (w/16 Port Modules)/ Hinged Wire Management, Prior to Sep. 1995.

Hubbell Premise Wiring, Inc. Full Line Catalog #1100R, pp. 13, 48, 58 and 64, Prior to Sep. 1995.

Primary Examiner—Robert W. Gibson, Jr.
Attorney, Agent, or Firm—Jerry M. Presson; Mark S. Bicks

[57] ABSTRACT

A panel assembly has a bracket with support elements for mounting the bracket on a wall. First and second panels are attached to the bracket by a bracket hinge for pivotal movement about a first pivot axis relative to the bracket between a closed position and an open position. A panel hinge couples the first panel to the second panel for pivotal movement of the first panel relative to the second panel about a second pivot axis between open and closed positions. The pivot axes are angularly oriented.

29 Claims, 6 Drawing Sheets

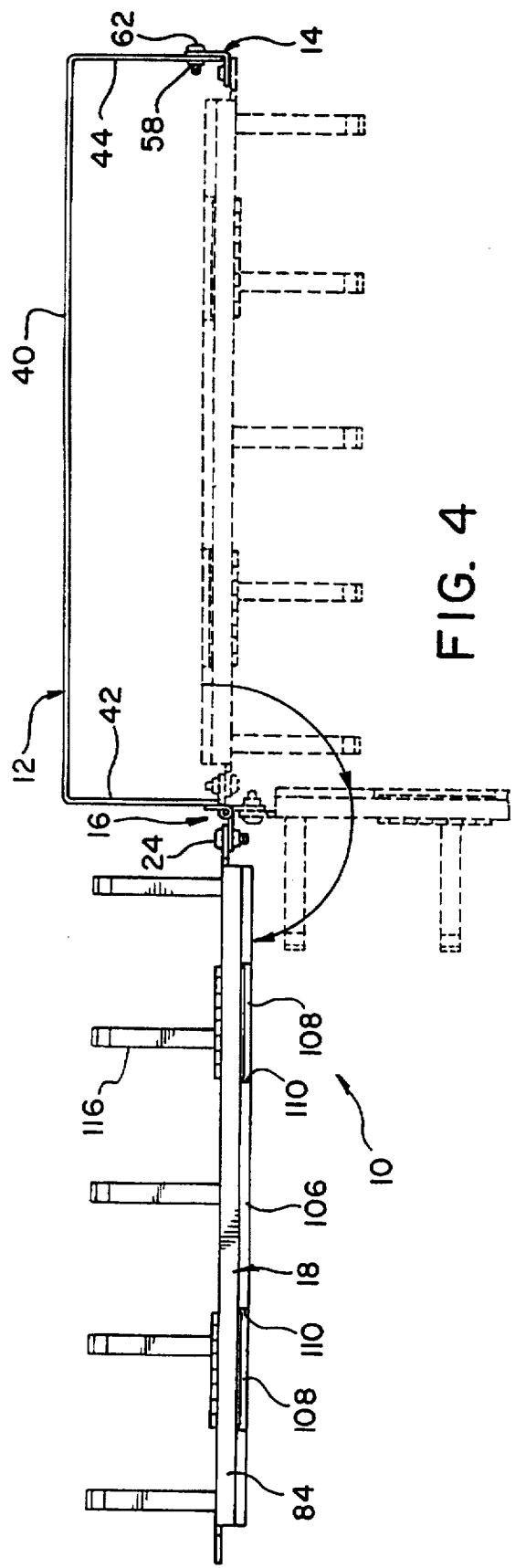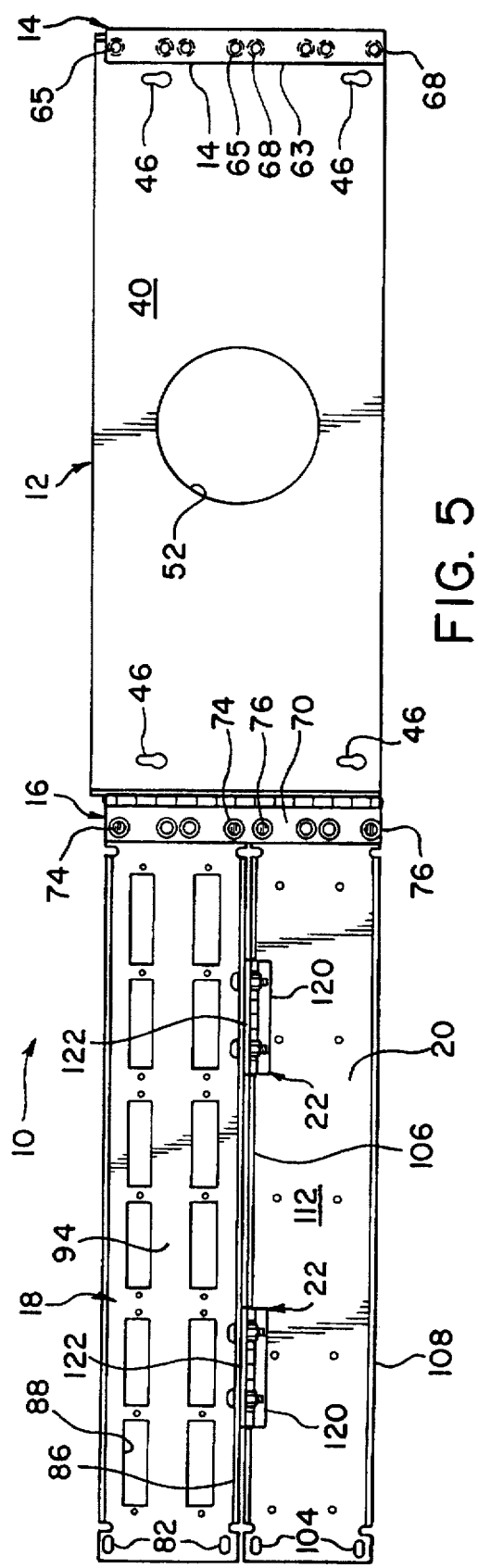

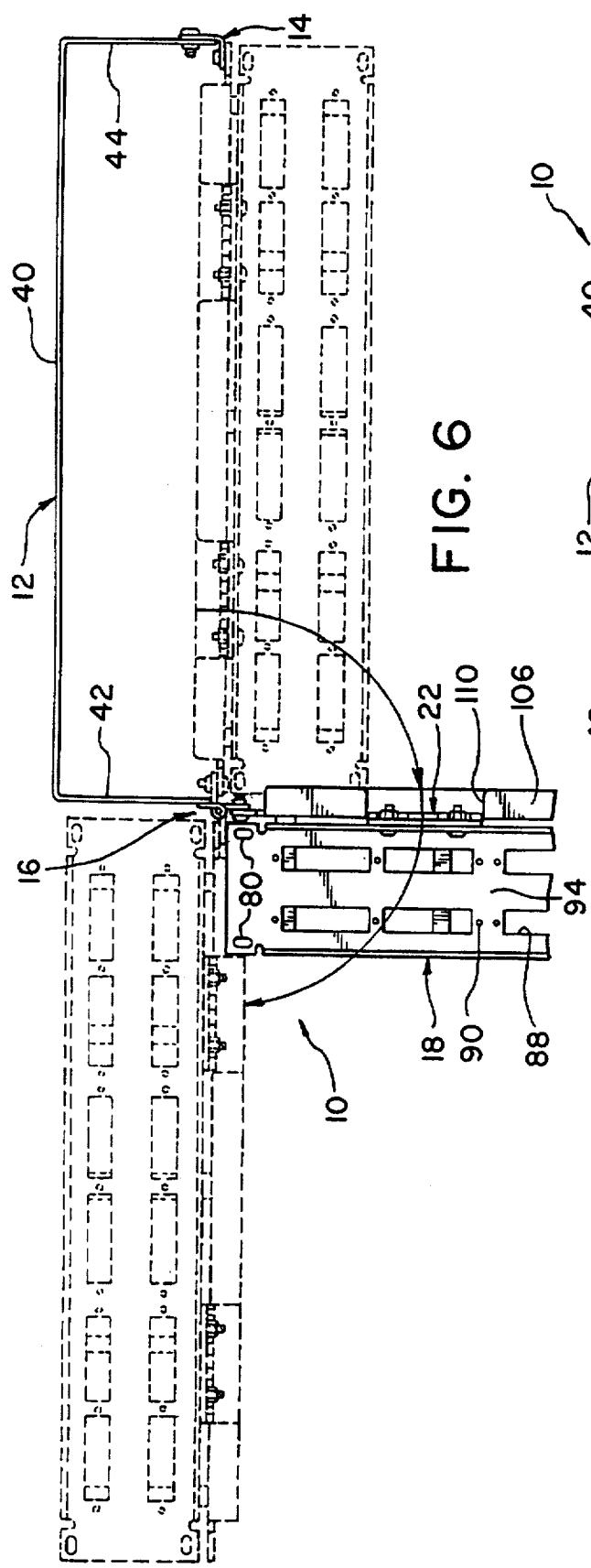
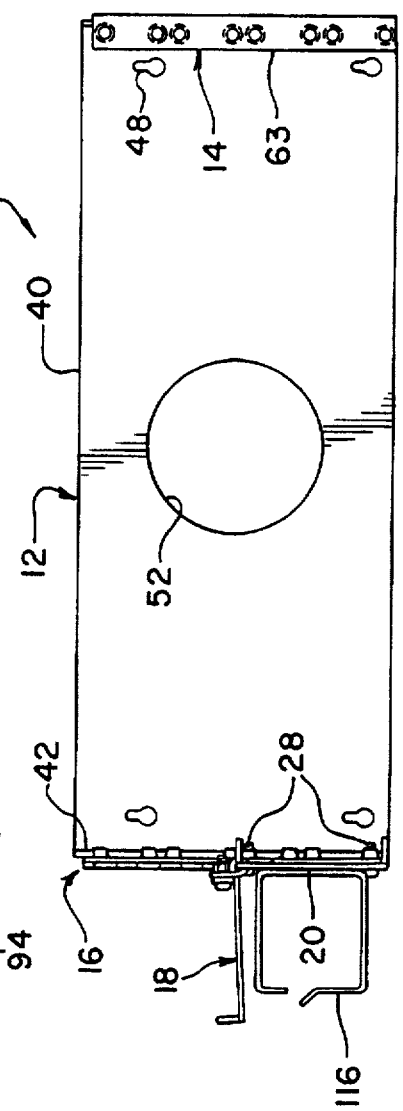
FIG. 6
FIG. 7

20 1

PANEL ASSEMBLY WITH ANGULARLY ORIENTED HINGES

FIELD OF THE INVENTION

The present invention relates to cross-connect products for voice and data wiring systems. More specifically, the invention relates to a panel assembly having a patch panel that can pivot about two different, angularly oriented axes to facilitate access to the patch panel for wire terminations.

BACKGROUND OF THE INVENTION

Cross-connect products for use in voice and data wiring systems are commonly located in confined, relatively remote areas, such as termination closets. Installers generally perform wire terminations with little room to maneuver patch panels or themselves. Therefore, cross-connect panel assemblies must be compact to save space, and to facilitate installer access to the patch panel.

Currently, most patch panels are mounted on either a rack or a wall mount bracket and require rear access. Most conventional rack mounted patch panels are inefficient in confined spaces since they require the placement of 7 foot relay racks within those areas and also require sufficient amounts of space behind the panel to terminate the wires. A large, unused portion of the racks occupy much needed space, while the patch panel is mounted on only a small portion of the rack. Additionally, typical rack mounted patch panels are not hingeable and stackable. Still further, with a rack mounted patch panel of the fold down type, identification of individual ports is difficult in the folded down position since the port identifiers are upside down.

Also, conventional bracket mounted patch panels cannot be densely stacked and provide limited patch panel access. Access to the patch panel occurs by pivoting the patch panel in only one direction. Additionally, cable access to conventional mounted brackets occurs through the top or bottom of the bracket to prohibit stacking.

Examples of prior art cross-connect products having pivoting patch panels are the Ortronics Bottom-Hinged Wall Mount Brackets, the Ortronics Category 5 110 PCB Patch Panels (w/6 Port Modules)/Hinged Wire Management, and the Hubbell Premise Wiring, Inc. Mounting Bracket number BRMCCMB.

SUMMARY OF THE INVENTION

Accordingly, an object of this invention is to provide a compact cross-connect panel assembly with easy front access which is simple and inexpensive to manufacture.

Another object of this invention is to provide a cross-connect panel assembly that can be stacked on top of other cross-connect panel assemblies.

A further object of the invention is to provide a panel assembly having a patch panel that can pivot about two different axes and is readily adaptable to a wide variety of installations.

Still another object of this invention is to provide a panel assembly having a fold down patch panel with inverted port identifiers facing right-side up when viewed by an installer to facilitate port identification when the panel is folded down for wire terminations.

The foregoing objects are basically attained by a panel assembly comprising a bracket with support means for mounting the bracket on a wall. First and second panels are attached to the bracket by a bracket hinge for pivotal movement about a first pivot axis relative to the bracket between a closed position and an open position. A panel hinge couples the first panel and the second panel for pivotal movement of the first panel relative to the second panel about a second pivot axis between open and closed positions. The pivot axes are angularly oriented.

Other objects, advantages, and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this disclosure:

FIG. 4 is a top plan view of the panel assembly illustrated in FIG. 1, showing the pivotal movement of the patch and wire management panels from the closed position to the open position when the panels are coplanar;

FIG. 5 is a front elevation view of the panel assembly shown in FIG. 4 with both panels in the open position;

FIG. 6 is a partial top plan view of the panel assembly of FIG. 1, showing the patch and wire management panels pivoting from a closed position to an open position, with the patch panel in the folded down position;

FIG. 7 is a front elevational view of the panel assembly of FIG. 6;

DETAILED DESCRIPTION OF PREFERRED EMBODIMENT

Figure 1:
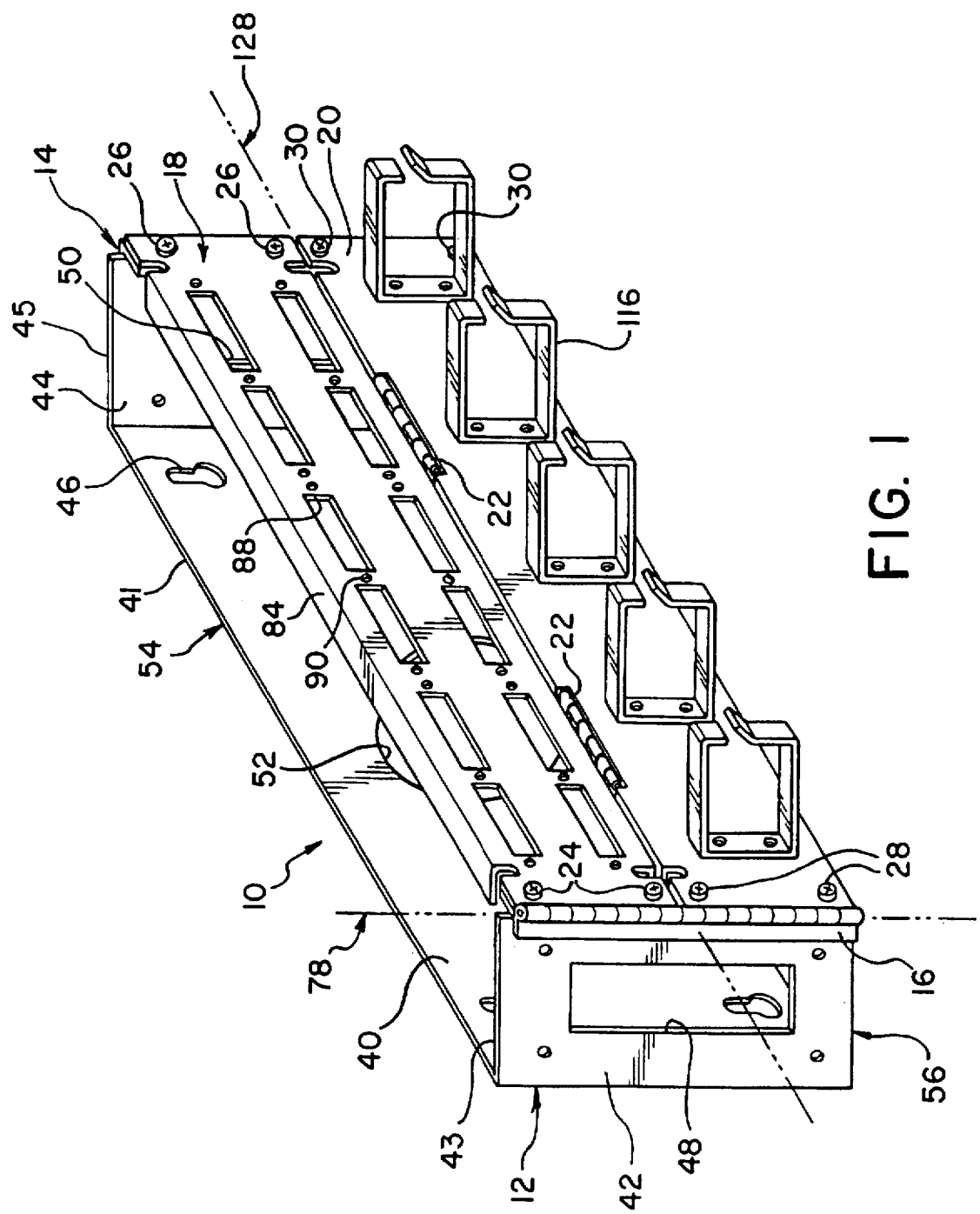
FIG. 1 is a perspective view of the panel assembly in accordance with the present invention.
Figure 9:
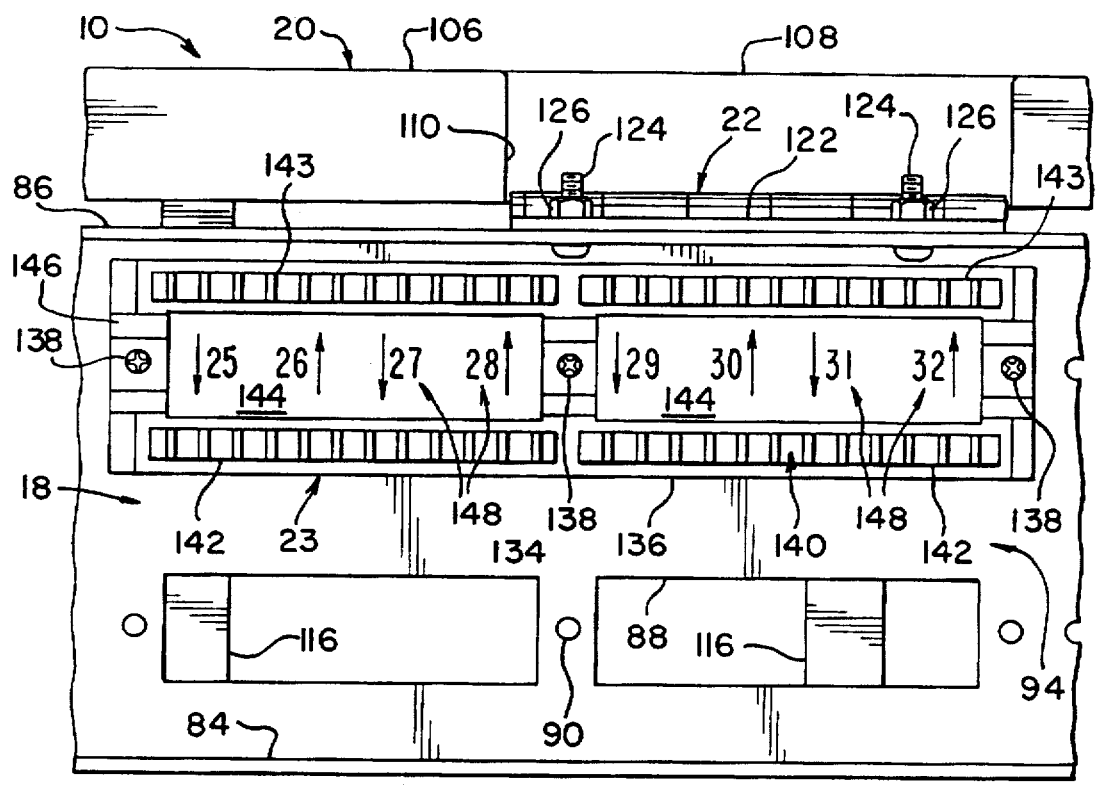
FIG. 9 is a partial top plan view of the panel assembly in accordance with the present invention showing the patch panel in its folded down position with one multiport adapter attached thereto.

Referring initially to FIG. 1, a panel assembly 10 according to the present invention comprises a mounting bracket 12, a bracket attachment 14, a bracket hinge 16, a patch panel 18, a wire management panel 20, and a panel hinge 22. Pairs of selectively engageable fastening elements or screws 24, 26, 28, and 30 connect the panels 18 and 20 to the bracket hinge 16 and the bracket attachment 14. The engagement or disengagement of fastening elements 24 and 26 and 30 with the bracket hinge and the bracket attachment will determine the ability of the patch panel 18 to fold down and the ability of both panels 18 and 20 to pivot open. As illustrated in FIG. 9, multiport adapters 23 are affixed to the patch panel 18 for the wire terminations.

As seen in FIG. 1, mounting bracket 12 has a base member 40, a first side member 42 and a second side member 44. The base member 40 extends between and is perpendicular to the side members 42 and 44. Also, the base member 40 has support means in the form of holes 46 for mounting the bracket 12 on a wall (not shown). Although holes 46 are shown as circular openings with slots, any suitable supporting device can be attached to or incorporated in the bracket for mounting the bracket on a wall. Further, the holes 46 may be located in any convenient location in the bracket 12.

The first side member 42, the second side member 44, and the base member 40 each have a cable entry aperture 48, 50, 52, respectively. These apertures 48, 50 and 52 receive cable into the bracket 12 and provide access to the adapters 23 on the patch panel 18. Cable entry apertures 48, 50 and 52 are positioned to enable the cable to enter the mounting bracket at locations other than through the top 54 or the bottom 56 of the bracket 12. Since the cable is not entering through the top 54 or the bottom 56 of the bracket nor occupying the space adjacent thereto, other panel assemblies 10 can be stacked directly above or below the panel assembly 10. This stacking feature is described in greater detail below.

As shown in FIGS. 3–5 and 11, the second side member 44 has a reinforced threaded hole 58 for receiving a selectively engageable fastener or screw 62 and for securing the bracket attachment 14. Bracket attachment 14 is L-shaped. A first end 60 of the bracket attachment 14 has a recess 61 (not shown) that is sized and located to slidably receive screw 62. When the screw 62 is loosened, the connection between the recess 61 and the screw 62 is such that the bracket attachment 14 can be slidably removed from the bracket 12. Disengagement of the bracket attachment 14 in this manner allows for simplified detaching and swinging of the panels 18 and 20 to an open position. When the screw 62 is tightly secured within the recess 61 in the first end 60 of the bracket attachment 14 and the hole 58, the bracket attachment 14 is securely affixed to the second side member 44 of the mounting bracket 12.

Second end 63 of the bracket attachment 14 is perpendicular to the first end 60 and has a first pair of reinforced internally threaded holes 65 for receiving screws 26, and a second pair of reinforced internally threaded holes 68 for receiving screws 30. The bracket attachment 14 is approximately one quarter of an inch shorter than the height of the second side member 44 to allow for stacking of multiple panel assemblies 10.

Figure 3:
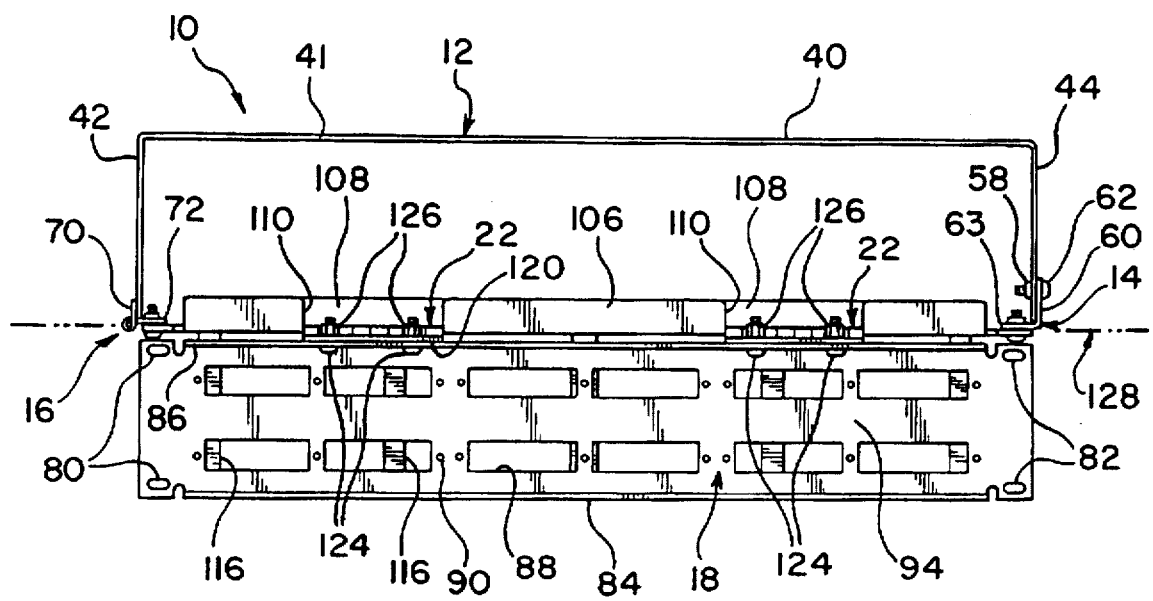
FIG. 3 is a top plan view of the panel assembly of FIG. 2 with the patch panel pivoted down in the open position.

As seen in FIGS. 1, 3 and 5, bracket hinge 16 has a first half 70 and a second half 72. The first half 70 of the bracket hinge 16 is attached to first side member 42 by spot welding, or alternatively, by any conventional method of fastening. The second half 72 of the bracket hinge 16 has two pairs of reinforced threaded holes 74 and 76. The first pair of reinforced threaded holes 74 is located above the second pair of holes 76 to receive screws 24 when attached to one end of the patch panel 18. The second pair of holes 76 receives screws 26 to attach to the hinged end of wire management panel 20.

As seen in FIGS. 1, 2, 4 and 6, the two halves 70 and 72 pivot relative to each other about pivot axis 78. Patch panel 18 and wire management panel 20 can pivot about pivot axis 78 when both panels 18 and 20 are attached to the bracket hinge 18. The panels 18 and 20 pivot from a closed position (FIG. 1) to an open position (FIG. 4 or 6), 180° from the closed position. In the closed position, the ends of the panels 18 and 20 opposite the bracket hinge 16 engage the bracket attachment 14.

Bracket hinge 16 is shorter in height than the first side member 42, typically by one quarter inch. The height of bracket hinge 16 is equivalent to the height of bracket attachment 14. This enables stacking of multiple panel assemblies 10.

Patch panel 18 is of conventional design. As seen in FIGS. 1, 3 and 5, patch panel 18 is rectangular and has two pairs of slots 80 and 82, one pair at each end. Slots 80 receive screws 24 for selectively fastening the patch panel 18 to the bracket hinge 16. Slots 82 receive screws 26 for selectively fastening to bracket attachment 14.

Figure 8:
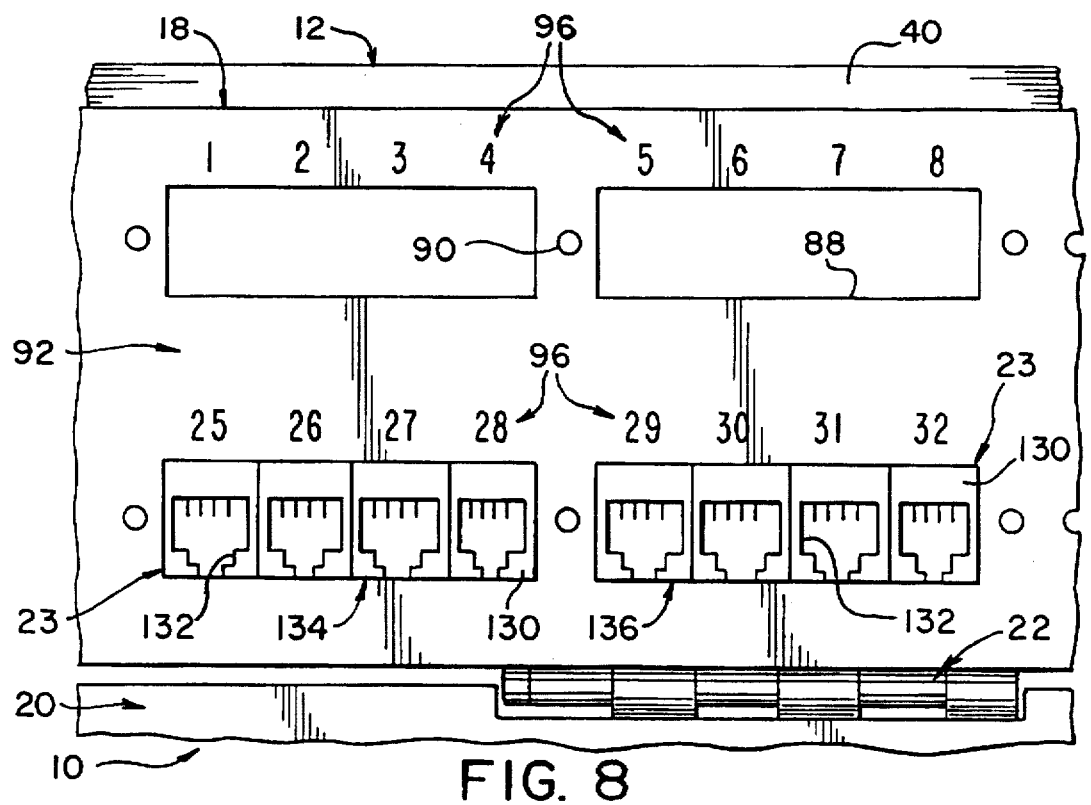
FIG. 8 is a partial front elevational view of the panel assembly in accordance with the present invention showing the patch panel in the closed position with one multiport adapter attached thereto.

Patch panel 18 has upper and lower bent sections 84 and 86. The lower bent section 86 provides a surface for attaching the panel hinges 22. Patch panel 18 also has elongated, rectangular openings 88 for receiving multiport adapters 23. The rectangular openings 88 are configured in a conventional manner to receive six multiport adapters 23 resulting in 48 connection ports or jacks 132. Recessed apertures 90 are located adjacent each rectangular opening 88 for receiving fasteners 138 associated with the multiport adapter 23 for securing the multiport adapter 23 to the patch panel 18. As seen in FIG. 8, the front surface 92 of the patch panel 18 includes indicia 96 for indicating the identity of each jack 132. Although patch panel 18 has been disclosed as having twelve openings 88 that receive six adapters, the patch panel 18 may be altered to receive other types and numbers of adapters.

Wire management panel 20 has a pair of slots 104. Slots 102 selectively receive screws 28 for connecting wire management panel 20 to the lower half of the bracket hinge 16. A pair of similar slots (not shown) are located at the opposite end of the wire management panel 20 and receive screws 30 for connecting the wire management panel to the lower half of the bracket attachment 14.

Wire management panel 20 also has upper and lower bent sections 106 and 108. Lower bent section 108 extends in a continuous fashion, whereas upper bent section 106 has two openings 110. Openings 110 enable panel hinges 22 to be attached to the rear surface 112 of the wire management panel 20.

The front surface 114 of the wire management panel 20 has five wire holders 116. Each wire holder 116 is a five-bend metal wire ring connected to the front surface 114 by welding, rivets, screws, or other conventional means. The holders 116 prevent entanglement of patch cables.

Panel hinges 22 pivotally secure the patch panel 18 to the wire management panel 20. A first half 120 of each panel hinge 22 is welded or otherwise connected to the rear surface 112 of the wire management panel 20. A second half 122 of each panel hinge 22 is secured to the lower bent section 86 of patch panel 18 by screws 124 and nuts 126, or alternatively, in any conventional manner.

Figure 2:
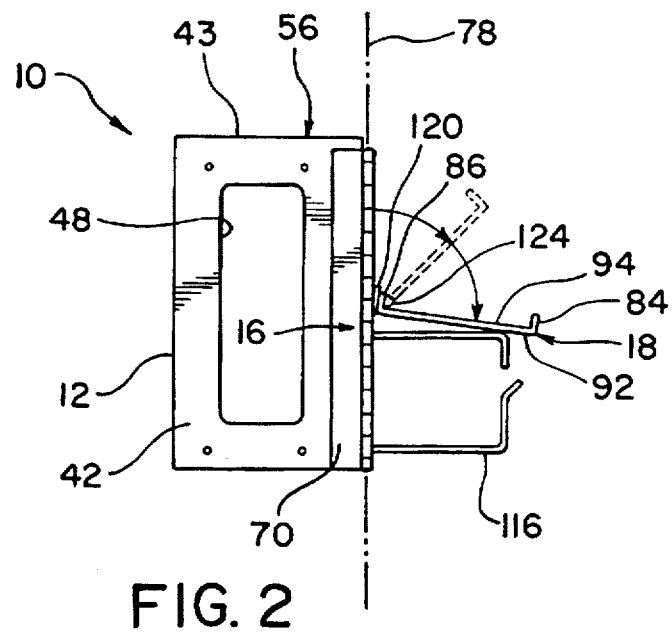
FIG. 2 is a side elevational view of the assembly illustrated in FIG. 1 and showing the patch panel pivoted down to an open position.

The two halves 120 and 122 of the panel hinges 22 join to form a second pivot axis 128. Pivot axis 128 is perpendicular to first pivot axis 78 and enables the patch panel 18 to pivot from the closed position shown in FIG. 1 down to an open position shown in FIGS. 2 and 3. Panel hinges 22 have sufficient freedom of rotation to enable the patch panel 18 to rotate down until it contacts wire holders 116. When the patch panel 18 is rotated down as shown in FIG. 2, the wire holders 116 act as a bench that supports the patch panel 18 during the termination of wires to the multiport adapters 23. Although two pivot panel hinges 22 are shown, a single panel hinge 22 or more than two panel hinges 22 can also be used.

Figure 10:
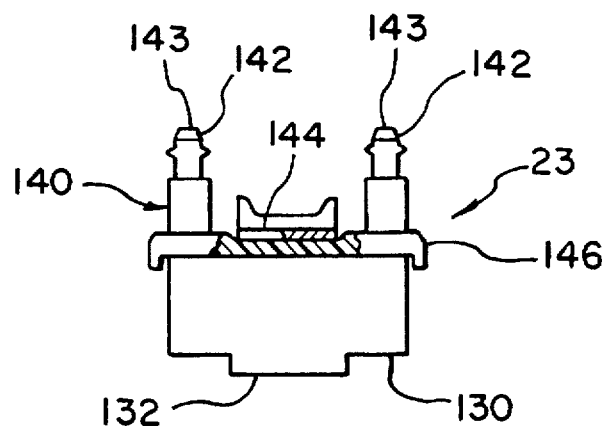
FIG. 10 is a partial side elevational view of the multiport adapter in accordance with the present invention.
Figure 11:
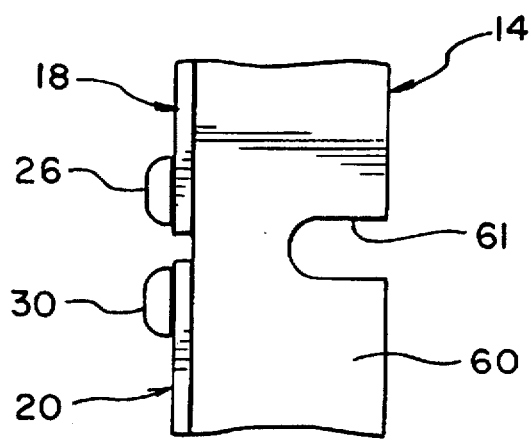
FIG. 11 is a partial side elevational view of the bracket attachment in accordance with the present invention separated from the bracket.

As seen in FIGS. 8–10, multiport adapter 23 is a Category 5, 110-type multiport adapter. Since the adapter 23 for each pair of openings 88 is substantially identical, only one adapter 23 will be described in detail.

Adapter 23 has a front surface 130 with eight openings or jacks 132 for receiving conventional plugs (not shown). The front surface 130 is divided into a first half 134 and a second half 136. Each half 134 and 136 is inserted into one rectangular opening 88 and has four jacks 132. As best seen in FIG. 8, the front surface 92 of the patch panel 18 is marked numerically to indicate the identity of each jack 132.

Screws 138 typically fasten the adapter 23 to the rear surface 94 of the patch panel. The screws 138 are received by the recessed apertures 90. The rear portions 140 of the adapters 23 have terminal extensions 142 which provide connection points for wires (not shown) during the termination process. The terminal extensions 142 are divided into ports 143. Each jack 132 has a respective port 143.

When the patch panel 18 is folded down as in FIG. 2, the front surface 92 of the patch panel 18 is hidden from view, and an installer cannot easily identify or distinguish individual ports 143. Therefore, adhesive labels 144 are attached to a protective covering 146 positioned over the rear portion 140 of the adapter 23. Each label 144 contains numerical indicia 148 that identifies each port 143. The indicia 148 on the label 144 is identical to the indicia 96 that is located on the front surface 92 of the patch panel 18. Although Category 110-type adapters 23 have been shown, the patch panel 18 can be configured to receive other types of adapters.

FIG. 1 shows the panel assembly 10 in its fully closed position. Cable enters the panel assembly through one or more of the cable entry apertures 48, 50 and 52. When an installer needs to perform wire terminations on the adapters 23, the rear portion 140 of the adapters 23 must be accessed. The panel assembly 10 provides the installer with numerous options for accessing the rear portion 140 of the adapters 23 depending upon how the panel assembly is situated, and the space available for the installer to maneuver around the panel assembly 10.

A first option for the installer is to pivot the patch panel 18 from the closed position shown in FIG. 1 to the open position shown in FIGS. 2 and 3. The installer removes the selectively engageable fastener elements or screws 24 and 26 and pivots the patch panel 18 about the first pivot axis 78. Although FIG. 1 shows both sets of screws 24 and 26 securing the patch panel to the bracket 12, it should be understood that only one selectively engageable fastening element, located at the position of the uppermost screw 26 as shown in FIG. 1, is needed to secure and release the patch panel 18 as shown.

Once the patch panel 18 is in the open position shown in FIGS. 2 and 3, additional access to the patch panel 18 and the interior of the mounting bracket 12 can be achieved. This second option is achieved by swinging the wire management panel 20, with the patch panel folded down on top of it, about the pivot axis 78 as shown in FIGS. 6 and 7. The installer need only remove the screws 30 to free the wire management panel 20 for pivoting as shown in FIG. 6.

If the installer selects not to fold down the patch panel 18 as described above, the patch panel 18 and the wire management panel 20 can maintain their vertical, coplanar orientation as shown in FIG. 1. This third option involves pivoting both upright panels 18 and 20 to an open position about pivot axis 78 as shown in FIGS. 4 and 5. This pivoting action is achieved by removing screws 26 and 30 from the patch panel and the wire management panel, respectively. Screws 24 remain attached to bracket hinge 16 and maintain the patch panel 18 in its upright position. Alternatively, screw 62 may be loosened, and the bracket attachment 14 may be removed from the bracket 12 along with the panels 18 and 20 to pivot the panels 18 and 20 to the open position as shown in FIGS. 4 and 5.

Although selectively engageable fastening elements 24, 26, 28, 30 and 62 are described as screws, any selectively engageable fastening element may be used. For instance, bayonet-type or snap-fit fasteners can be employed to simplify opening and closing the panels 18 and 20. Also, although multiple screws 24, 26, 28 and 30 are shown at each end of the panels 18 and 20, a single fastener, or three or more fasteners can be used depending upon the application. Still further, since screws 28 attaching the wire management panel 20 to the hinge 16 are not removed for the opening positions described above, fasteners 28 may be replaced with non-selectively engageable fastening elements. For instance, screws 28 may be replaced with spot welding. Finally, although the panel assembly has been disclosed as pivoting open in a clockwise direction when viewed from the top, the panel assembly 10 may be configured such that the panels 18 and 20 pivot in a counter-clockwise direction. The pivot axis 78 and bracket hinge 16 would then be secured to second side member 44.

The panel assembly 10 can be stacked on top of or below other assemblies similar to panel assembly 10. This stacking feature is possible since the cables entering the bracket 12 are not required to enter the bracket 12 through the top 54 or bottom 56 of the bracket 12. The cables can enter the bracket 12 through the lateral or side cable entry apertures 48, 50 and 52. Also, the height of the panels 18 and 20, the bracket hinge 16, and the bracket attachment 14 is less than the height of the first and second side members 42 and 44 by approximately one quarter inch. This establishes clearance for an assembly 10 placed on top of bracket 12. Since the upper bent section 84 of the patch panel 18 is spaced from the top edge of the side members 42 and 44, the patch panel 18 is free to swing open even if a second panel assembly 10 is located on the base member upper surface 41 and the side member upper surfaces 43 and 45.

All elements of the panel assembly 10 described are preferably constructed from aluminum. However, other metals and other materials with sufficient structural characteristics can be used.

While a particular embodiment has been chosen to illustrate the invention, it will be understood by those skilled in the art that various changes and modifications can be made therein without departing from the scope of the invention as defined in the appended claims.

What is claimed is:

1. A panel assembly, comprising:
   a bracket with support means for mounting said bracket on a wall;
   first and second panels attached to said bracket by a bracket hinge for pivotal movement about a first pivot axis relative to said bracket between a closed position and an open position; and
   a panel hinge coupling said first panel and said second panel for pivotal movement of said first panel relative to said second panel about a second pivot axis between open and closed positions, said pivot axes being angularly oriented.

2. A panel assembly according to claim 1 wherein said bracket has a first side member, a second side member and a base member, said base member extending between said first and second side members.

3. A panel assembly according to claim 2 wherein said first side member, said second side member, and said base member each have a cable entry aperture.

4. A panel assembly according to claim 2 wherein
said first panel has a first panel height;
said second panel has a second panel height; and
said first side member has a height greater than the sum of said first and second panel heights.

5. A panel assembly according to claim 4 wherein
said first panel has a first panel upper surface;
each of said first and second side members has a side member upper surface; and
said first panel upper surface is spaced from said side member upper surfaces in a direction perpendicular to said upper surfaces to enable stacking of multiple panel assemblies.

6. A panel assembly according to claim 1 wherein
said first panel is a patch panel having at least one opening extending therethrough for receiving a jack; and
said second panel is a wire management panel having at least one wire holder.

7. A panel assembly according to claim 1 wherein
said first panel has a selectively engageable fastener for releasably attaching said first panel to said bracket.

8. A panel assembly according to claim 7 wherein
said second panel has a selectively engageable fastener for releasably attaching said second panel to said bracket.

9. A panel assembly according to claim 8 wherein
each said panel has multiple selectively engageable fasteners for selectively attaching said panels to said bracket and panel hinge.

10. A panel assembly according to claim 9 wherein
said multiple selectively engageable fasteners are screws.

11. A panel assembly according to claim 6 wherein
said patch panel and said wire management panel each have selectively engageable hinge fastening elements for releasably attaching said panels to said bracket hinge and bracket fastening elements for releasably attaching said panels to said bracket at locations spaced from said bracket hinge.

12. A panel assembly according to claim 11 wherein
said hinge fastening elements and said bracket fastening elements are screws.

13. A panel assembly according to claim 1 wherein
said first pivot axis is substantially perpendicular to said second pivot axis.

14. A panel assembly according to claim 1 wherein
said support means are holes for receiving wall attaching elements.

15. A panel assembly, comprising:
a bracket with support means for mounting said bracket on a wall, said bracket having first and second side members and a base member extending between said first and second side members each of said first and second side members having a side member upper surface;
first and second panels attached to said bracket; and
a panel hinge coupling said first panel and said second panel for pivotal movement of said first panel relative to said second panel about a pivot axis between open and closed positions, said first panel being positioned above said second panel and having an uppermost surface extending between said side members when said first panel is in said closed position, a rear surface facing said base member when said first panel is in said closed position and a front surface opposite said rear surface, said first and second side members extending upwardly beyond said uppermost surface of said first panel when said first panel is in said open position and in said closed position such that said side member upper surfaces are spaced above said uppermost surface to enable stacking of a plurality of panel assemblies.

16. A panel assembly, comprising:
a bracket with support means for mounting said bracket on a wall, said bracket having first and second side members and a base member extending between said first and second side members;
first and second panels attached to said bracket; and
a panel hinge coupling said first panel and said second panel for pivotal movement of said first panel relative to said second panel about a pivot axis between open and closed positions, said first panel having an uppermost surface, a rear surface facing said base member when said first panel is in said closed position and a front surface opposite said rear surface, said first and second side members extending beyond said uppermost surface of said first panel to enable stacking of a plurality of panel assemblies,
said first and second panels being attached to said bracket by a bracket hinge for pivotal movement about another pivot axis relative to said bracket between a closed position and an open position, said pivot axes being angularly oriented.

17. A panel assembly according to claim 16 wherein
said pivot axes are substantially perpendicular to one another.

18. A panel assembly according to claim 1 wherein
said first panel has a selectively engageable fastener for releasably attaching said first panel to said bracket.

19. A panel assembly according to claim 7 wherein
said second panel has a selectively engageable fastener for releasably attaching said second panel to said bracket.

20. A panel assembly according to claim 8 wherein
each said panel has multiple selectively engageable fasteners for selectively attaching said panels to said bracket and panel hinge.

21. A panel assembly according to claim 20 wherein
said multiple selectively engageable fasteners are screws.

22. A panel assembly according to claim 15 wherein
said first side member, said second side member, and said base member each have a cable entry aperture.

23. A panel assembly according to claim 22 wherein
said first panel is a patch panel; and
said second panel is a wire management panel.

24. A panel assembly according to claim 23 wherein
said patch panel has a plurality of openings therethrough for receiving jacks.

25. A panel assembly according to claim 24 wherein
said wire management panel has a plurality of wire holders.

26. A panel assembly, comprising:
a bracket with support means for mounting said bracket on a wall, said bracket having first and second side members and a base member extending between said first and second side members, said first side member, said second side member, and said base member each having a cable entry aperture;
first and second panels attached to said bracket, said first panel being a patch panel having a plurality of openings therethrough for receiving jacks and said second panel being a wire management panel;

a panel hinge coupling said first panel and said second panel for pivotal movement of said first panel relative to said second panel about a pivot axis between open and closed positions, said first panel having an uppermost surface, a rear surface facing said base member when said first panel is in said closed position and a front surface opposite said rear surface, said first and second side members extending beyond said uppermost surface of said first panel to enable stacking of a plurality of panel assemblies;

a plurality of jacks being attached to said plurality of openings, each of said jacks having a rear portion adjacent said rear surface of said patch panel and a front portion adjacent said front surface of said patch panel, said rear portion of each of said jacks facing said base member when said patch panel is in said closed position, said front portion facing opposite said rear portion; and indicating means being located on said rear portion of each of said jacks such that when said patch panel is in said closed position and when said front portion of each of said jacks is hidden from view, said indicating means indicating individual identities of said jacks.

27. A panel assembly according to claim 26 wherein said indicating means are adhesively attached to said rear portion of each of said jacks.

28. A panel assembly, comprising:

a bracket with support means for mounting said bracket on a wall, said bracket having first and second side members each with an uppermost surface and a base member extending between said first and second side members, each of said first and second side members and said base member having a cable entry aperture;

a patch panel and a wire management panel attached to said bracket by a bracket hinge for pivotal movement about a first pivot axis relative to said bracket between a closed position and an open position, said patch panel being located between said uppermost surfaces and said wire management panel and being spaced from said uppermost surfaces of said first and second side members, said patch panel having a rear surface, a front surface opposite said rear surface and a plurality of openings extending completely through said patch panel from said front surface to said rear surface;

a panel hinge coupling said patch panel and said wire management panel for pivotal movement of said patch panel relative to said wire management panel about a second axis between an open position and a closed position, said pivot axes being substantially perpendicular to each other;

a plurality of jacks, each of said jacks attached to one of said plurality of openings; and at least one screw for selectively fastening said panels to said bracket.

29. A panel assembly according to claim 28 wherein said patch panel rear surface faces said base member when said patch panel is in said closed position;

each of said jacks having a rear portion adjacent said rear surface of said patch panel and a front portion adjacent said front surface of said patch panel, said rear portion of each of said jacks facing said base member when said panel is in said closed position; and indicating means are located on said rear portion of each of said jacks for individually identifying each of said jacks.

* * * * *